US006950212B1

(12) United States Patent
Weidlich

(10) Patent No.: US 6,950,212 B1
(45) Date of Patent: Sep. 27, 2005

(54) METHOD FOR MAKING AND EVALUATING A SAMPLE CUT

(75) Inventor: Gottfried Ernst-Rudolf Weidlich, Kiel (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/445,145

(22) PCT Filed: May 27, 1998

(86) PCT No.: PCT/DE98/01441

§ 371 (c)(1),
(2), (4) Date: Feb. 16, 2000

(87) PCT Pub. No.: WO98/55302

PCT Pub. Date: Dec. 10, 1998

(30) Foreign Application Priority Data

Jun. 2, 1997 (DE) .......................................... 197 22 762

(51) Int. Cl.⁷ ............................. B41C 1/04; G06F 19/00
(52) U.S. Cl. ...................... 358/3.29; 358/406; 700/192; 700/193; 700/195
(58) Field of Search ................................ 700/195, 186, 700/56–66, 192, 193; 358/3.01, 299, 3.29, 3.32, 3.3, 3.31, 1.9, 406; 356/625–626, 635; 382/152

(56) References Cited

U.S. PATENT DOCUMENTS

| 5,050,112 | A | * | 9/1991 | Hedglen et al. | ............. | 702/152 |
| 5,293,426 | A | * | 3/1994 | Wouch et al. | ............. | 358/3.29 |
| 5,422,958 | A | * | 6/1995 | Wouch et al. | ............. | 358/3.29 |
| 5,671,063 | A | * | 9/1997 | Auberry et al. | ............. | 358/3.29 |
| 5,818,605 | A | * | 10/1998 | Crewe et al. | ............. | 358/3.29 |
| 5,825,503 | A | * | 10/1998 | Brewer et al. | ............. | 358/3.29 |
| 5,828,464 | A | * | 10/1998 | Yoshida et al. | ............. | 358/3.29 |
| 5,831,746 | A | * | 11/1998 | Seitz et al. | ............. | 358/3.29 |
| 6,007,230 | A | * | 12/1999 | Beckett et al. | ............. | 700/160 |
| 6,357,976 | B1 | * | 3/2002 | Weidlich | ............. | 409/131 |
| 6,523,467 | B2 | * | 2/2003 | Fangmeyer et al. | ......... | 101/32 |
| 6,538,774 | B2 | * | 3/2003 | Weidlich | ............. | 358/3.29 |
| 6,542,783 | B2 | * | 4/2003 | Takahashi et al. | ............ | 700/58 |

FOREIGN PATENT DOCUMENTS

| DE | 2508734 | * | 8/1976 | ............. | B41C/1/04 |
| DE | 197 17 990 | | 11/1997 | ............. | B41C/1/02 |
| EP | 0595324 | * | 10/1993 | .......... | B41C/1/045 |
| EP | 0 595 324 | | 5/1994 | .......... | B41C/1/045 |
| JP | 11042757 | * | 2/1999 | .......... | B41C/1/045 |
| WO | WO9419900 | * | 9/1994 | ............. | H04N/1/00 |
| WO | WO 95/08443 | | 3/1995 | ............. | B41C/1/02 |
| WO | WO 96/26837 | | 9/1996 | .......... | B41C/1/045 |
| WO | WO 96/31349 | | 10/1996 | ............. | B41C/1/02 |
| WO | WO 96/33870 | | 10/1996 | ............. | B41C/1/04 |

* cited by examiner

Primary Examiner—Scott A. Rogers
(74) Attorney, Agent, or Firm—Schiff Hardin LLP

(57) ABSTRACT

In a method for making and evaluating a sample cut in an engraving machine, an engraving control signal for guiding a stylus is formed from engraving data. The stylus cuts a series of cups. During a trial engraving trial cups are engraved and a video image is made. In accordance with screen parameters, measuring points are fixed in the video image as distances to a selected reference point. Geometric parameters of the trail cups are measured in the video image and are compared to corresponding geometric parameters of the cups representing predetermined tone values. Adjustment values are deduced from this comparison which are used to calibrate the engraving control signal.

28 Claims, 6 Drawing Sheets

METHOD FOR MAKING AND EVALUATING A SAMPLE CUT

BACKGROUND OF THE INVENTION

The invention is in the field of electronic reproduction technology and is directed to a method for producing and evaluating a sample cut in an electronic engraving machine for engraving printing forms, particularly printing cylinders, for rotogravure.

In an electronic engraving machine, an engraving element with an engraving stylus as a cutting tool moves in an axial direction along a rotating printing cylinder. The engraving stylus controlled by an engraving control signal cuts a sequence of depressions, called cups, arranged in an engraving raster into the generated surface of the printing cylinder. The engraving control signal is formed in an engraving amplifier by superimposition of image signal values that represent the gradations between "light" (white) and "dark" (block) to be engraved with a periodic raster signal (vibration). Whereas the raster signal effects a vibrating lifting motion of the engraving stylus for generating the engraving raster, the image signal values determine the geometrical dimensions of the cups engraved into the generated surface of the printing cylinder.

So that the cups engraved when engraving the printing form correspond to the gradations prescribed by the image signal values, the engraving control signal must be calibrated. For that purpose, sample cups for predetermined gradations are engraved before the engraving of the printing form with what is referred to as a sample cut, for example for the gradations "light" and "dark". After the sample cut, the actual geometric dimensions of the engraved sample cups are identified and compared to the rated geometrical dimensions of those cups that represent the gradations prescribed for the sample engraving. Setting values, for example, for the parameters "light", "dark", and "vibration", are acquired from the comparison of the geometric dimensions, the engraving amplifier being calibrated with these such that the cups in fact produced in the later engraving correspond to the cups required for a gradation-correct engraving.

After the sample cut, the actual geometric dimensions of the engraved sample cups, for example the transverse diagonals, the longitudinal diagonals, the widths of the penetration and the web widths must be identified. Of the actual geometrical dimensions ensues by measuring the sample cups with a Earlier, the determination of the actual geometrical dimensions ensued by measuring the sample cups with a measuring microscope put in place on the printing cylinder and having an integrated scale.

WO-A-9 419 900 already discloses a method wherein the actual geometrical dimensions of the engraved sample cups are measured in a video image registered with a video camera.

In practice, the demand for a more exact evaluation of the video image of the sample cups is present in order to improve the engraving quality.

SUMMARY OF THE INVENTION

It is therefore an object of the present invention to improve a method for producing and evaluating a sample cut in an electronic engraving machine for engraving printing forms, particularly printing cylinders, for rotogravure such that an automated, exact determination of the actual geometric dimensions of the engraved sample cups is assured.

According to the method of the present invention for producing and evaluating a sample cut in an electronic engraving machine for engraving printing forms for rotogravure, an engraving control signal is formed for driving the engraving stylus of an engraving element from engraving data which represent rated gradations between "light" and "dark" to be engraved and from a periodic raster signal for generating an engraving raster. With the engraving stylus, a sequence of cups arranged in the engraving raster are engraved engraving line by engraving line into the printing cylinder, geometric parameters of the cups defining engraved, actual gradations. With the engraving element, implementing a feed motion directed in an axial direction of the printing cylinder for planar engraving of the printing cylinder. A sample engraving occurring before actual engraving of the printing form is provided wherein sample cups are engraved for predetermined rated gradations. The video image of the sample cups engraved in the sample engraving is produced. For measuring geometric parameters of the engraved sample cups, selecting an engraved sample cup in the video image for one of the predetermined rated gradations as a reference location in an XY-measuring system allocated to the video image. Dependent on the raster parameters of the engraving raster, measuring locations for measuring the geometric parameters of the specimen cups in the video image are defined as coordinate-related spacings from the selected reference location. The geometric parameters of the specimen cups at the determined measuring locations are measured by interpreting the video image and comprising them to the geometric parameters that define the predetermined rated gradations. Setting values are derived from the comparison with which the engraving control signal is calibrated such that the engraved actual gradations correspond to the rated gradations to be engraved.

The invention is explained in greater detail below with reference to FIGS. 1 through 9.

DESCRIPTION OF THE PREFERRED EMBODIMENTS

Figure 1:
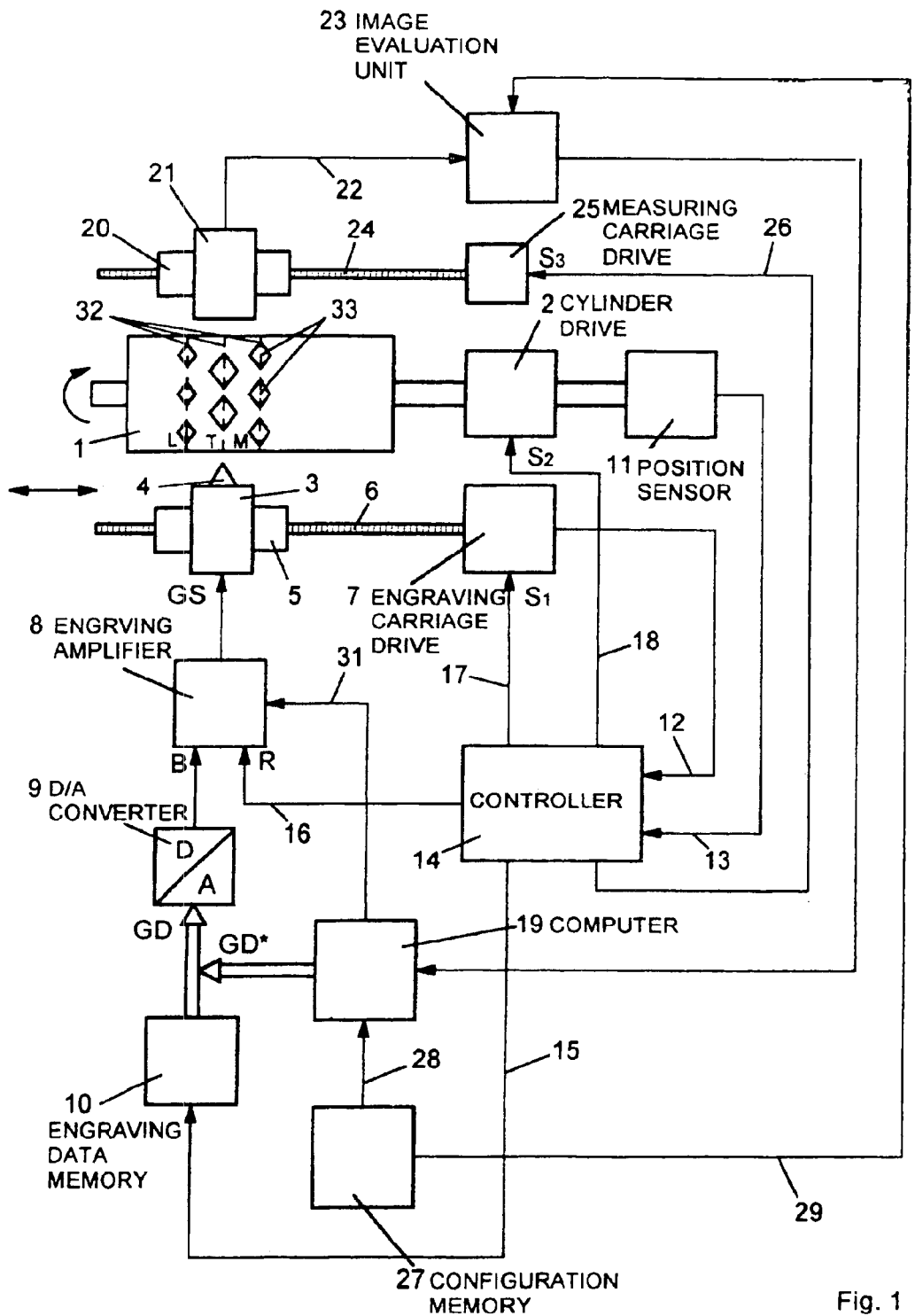
FIG. 1 is a schematic exemplary embodiment of an electronic engraving machine for engraving printing forms.

FIG. 1 shows a schematic exemplary embodiment of an electronic engraving machine for engraving printing forms for rotogravure. For example, the engraving machine is a HelioKlischograph® of Hell Gravure Systems GmbH, Kiel, Del.

A printing cylinder 1 is rotationally driven by a cylinder drive 2. The engraving on the printing cylinder 1 occurs with an engraving element 3 that, for example, is designed as an electromagnetic engraving element having an engraving stylus 4 as a cutting tool.

The engraving element 3 is located on an engraving carriage 5 that can be moved in the axial direction of the printing cylinder by an engraving carriage drive 7 with a spindle 6.

The engraving stylus 4 of the engraving element 3 cuts a sequence of cups arranged in an engraving raster into the generated surface of the rotating printing cylinder 1 engraving line by engraving line while engraving carriage 5 with the engraving element 3 moves along the printing cylinder 1 in the feed direction.

In the illustrated exemplary embodiment, the engraving of the cups occurs on individual engraving lines proceeding circularly in the circumferential direction around the printing cylinder (1), whereby the engraving carriage (5) implements an axial feed step to the next engraving line after the respective engraving of the cups of one engraving Line. Such an engraving method is disclosed, for example, in U.S. Pat. No. 4,013,829. Alternatively, the engraving can also occur in an engraving line helically proceeding around the printing cylinder 1, whereby the engraving carriage 5 then implements a continuous feed motion during engraving.

The engraving stylus 4 of the engraving element 3 is controlled by an engraving control signal (GS). The engraving control signal (GS) is formed in an engraving amplifier 8 by superimposition of a periodic raster signal (R) with image signal values (B) that represent the gradations of the cups to be engraved between "light" (white) and "dark" (black). While the periodic raster signal (R) effects a vibrating lifting motion of the engraving stylus 4 for producing the engraving raster, the image signal values (B) determine the respective geometric dimensions of the engraved cups such as penetration depth, traverse diagonal and longitudinal diagonal according to the image signal values (B).

The engraving raster is defined with respect to screen angle and screen width by the frequency of the raster signal (R), by the circumferential speed of the printing cylinder 1 and by the axial feed step width of the engraving element 3.

The analog image signal values (B) are acquired in a D/A converter 9 from engraving data (GD) that are deposited in an engraving data memory 10 and are read out therefrom engraving line by engraving line and are supplied to the D/A converter 9. An engraving datum of at least one byte is allocated in the engraving raster to each engraving location for a cup, this engraving datum containing, among other things, the gradation between "light" and "dark" to be engraved as engraving information, whereby, for example, the engraving datum GD=161 is allocated to the gradation "light" and the engraving datum GD=1 is allocated to the gradation "dark".

An XY-coordinate system whose X-axis is oriented in the axial direction and whose Y-axis is oriented in the circumferential direction of the printing cylinder 1 is allocated to the printing cylinder 1. The x-location coordinates of the engraving locations on the printing cylinder 1 arranged in the engraving raster that define the axial positions of the engraving stylus 4 of the engraving element 3 with reference to the printing cylinder 1 are generated by the engraving carriage drive 7. A position sensor 11 mechanically coupled to the cylinder drive 2 generates the corresponding y-location coordinates that define the relative circumferential positions of the rotating printing cylinder 1 relative to the engraving stylus 4 of the engraving element 3. The location coordinates (x, y) of the engraving locations are supplied to a controller 14 via lines 12, 13.

The controller 14 controls the addressing and the readout of the engraving data (GD) from the engraving data memory 10 dependent on the xy location coordinates of the current engraving locations via line 15. The controller 14 also generates the raster signal (R) on a line 16 with the frequency required for generating the engraving raster, a control command $S_1$ on a line 17 to the engraving carriage drive 7 for setting the feed step width relevant for producing the engraving raster and for controlling the step-by-step feed of the engraving element 3 during engraving and also generates a further control command ($S_2$) on a line 18 to the cylinder drive 2 for setting the circumferential speed of the printing cylinder 1 required for generating the engraving raster.

For implementation of a sample cut before the actual engraving of the printing form, the engraving machine comprises a computer 19 that supplies the engraving data (GD*) required for engraving the sample cups to the D/A converter 9. Each engraving datum (GD*) represents the predetermined rated gradation of a sample cup or, respectively, the corresponding rate geometrical value, for example the rated transfer diagonal or the rated longitudinal diagonal of the same cup.

For measuring the sample cups engraved in the sample cut, a measuring carriage 20 displaceable in the axial direction of the printing cylinder 1 and having a video camera 21 for registration of a video image of the sample cups and an image evaluation unit 23 connected to the video camera 21 via a line 22, which can also be integrated in the video camera, is provided for measuring the sample cups in the video image. The employment of a measuring carriage 20 is advantageous particularly given multi-channel engraving machines with which a plurality of engraving lanes are engraved with a respective engraving element 3. In this case, a corresponding sample cut must be implemented and measured for each engraving lane. The measuring carriage 20 can be automatically moved to the required, axial measuring position in the individual engraving lanes via a spindle 24, being moved by a measuring carriage drive 25. The measuring carriage drive 25 is controlled by a control instruction ($S_3$) on a line 26 proceeding from the controller 14.

Alternatively, the video camera 21 can also be arranged in the region of the engraving element 3, whereby the pickup of the video image can occur, for example, via a light-conducting cable.

A configuration memory 27 supplies the prescriptions required for engraving and for measuring the sample cups via a line 28, supplying these to the computer 19, and via a line 29 to the image evaluation unit 23. The measured results are transmitted as actual geometric values from the image evaluation unit 23 to the computer 19. In the computer 19, setting values for calibrating the engraving amplifier 8 are acquired by comparing the predetermined rated geometric values and measured actual values, these being supplied to the engraving amplifier 8 via a line 31. The engraving amplifier 8 is then calibrated with the identified setting such that the cups actually generated in the later engraving of the printing form correspond to the cups required for a gradation-correct engraving.

The calibration of the engraving amplifier 8 can occur automatically before the engraving of the printing form or on line during the engraving of the printing form. The calibration of the engraving amplifier 8, however, can also be manually implemented in that the identified setting values are merely indicated to the computer 19 these then being manually transferred onto the engraving amplifier 8.

For engraving the sample cups, the computer 19, for example, calls the engraving data (GD*) for the rated gradations "dark" (GD*=-1), "light" (GD*=161) and for at least one "mid gradation" (GD*=80) between "light" and "dark". The engraving data (GD*) that have been called are converted into the engraving control signal (GS) for the engraving element 3. The engraving element 3 engraves at least one sample cup 33 for "light" (L), "dark" (T) and "mid gradation" (M) in the engraving raster on engraving lines 32 that lie side-by-side. Preferably, a plurality of identical sample cups 33 are engraved on each engraving line 32, for example over a selectable engraving line region. When the web width is also to be identified in addition to the transverse diagonals and the longitudinal diagonals, sample cups 33 for "dark" must be engraved on at least two engraving lines (32) lying next to one another. A corresponding sample cut must be implemented for each color separation or, respectively, for each engraving raster, whereby the different parameters of the engraving raster such as screen angle and screen width are deposited in the configuration memory 27.

After the sample cut, the video camera 21 registers a video image of the engraved sample cups 33. The registration of the sample cups 33 can occur given a stationary printing cylinder 1- or can occur with a corresponding synchronization given a rotating printing cylinder 1.

The measuring of the geometrical parameters of the engraved sample cups 33 in the image evaluation unit 23 is explained in greater detail below on the basis of the registered video image.

Figure 2:
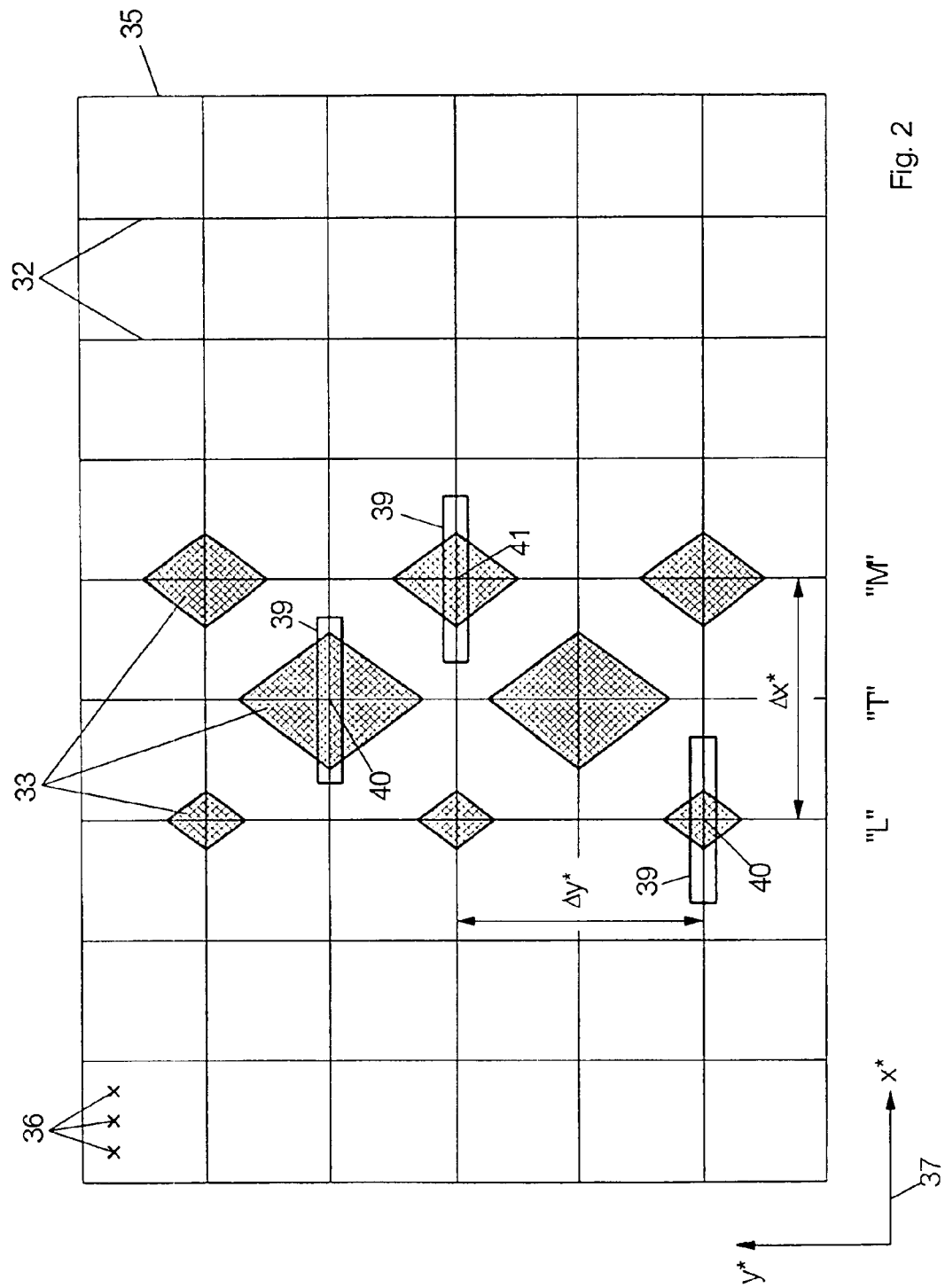
FIG. 2 is a video image of engraved sample cups.

FIG. 2 shows a video image 35 of the engraved sample cups 33 registered with the video camera 21. The orthogonal engraving raster composed of horizontal and vertical raster lines is shown, whereby the vertical raster lines are the engraving lines 32. For example, engraved sample cups 33 for "light" (L), "dark" (T) and "mid gradation" (M) are shown on three engraving lines 32 lying next to one another. The centers of gravity of the sample cups 33 lie on the inner sections of the raster lines of the engraving raster. In order to assure a dependable evaluation, the size of the video image 35 is selected such that at least one complete sample cup 33 lies within the video image 35 for each rated gradation.

The video image 35 is comprised of a plurality of pixels 36 whose position in the video image is defined by the location coordinates (x*, y*) of the XY measuring system, which is likewise aligned in axial direction and in circumferential direction of the printing cylinder 1. A video datum (VD) of, for example, 8 bits that identifies the respective gray scale value is allocated to each pixel 36, so that a total of 254 gray scale values can be distinguished between "black" (VD=0) and "white" (VD=255). The gray scale value scan be reduced to two values by filtering or with the thresholds such that, for example, those pixels that fall onto the generated surface of the printing cylinder 1 have the video datum VD=0 allocated to it and those pixels that lie on the areas of the sample cups 33 have the video datum VD=1 allocated to them. The contour (density discontinuity) of a cup surface is thereby identified by the switch of the video datum from "0" to "1" or from "1" to "0".

For measuring the geometrical parameters of the specimen cups 33 in the video image 35, at least one measuring field displaceable over the video image 35 is defined. The measuring field is designed stripe-shaped in the exemplary embodiment and is referred to below as measuring band 39 whose longitudinal expanse is at least equal to the spacing of two engraving lines from one another. The measuring of the specimen cups 33 for "light", "dark" and "mid gradation" can ensure successively with one measuring band 39 or can respectively ensure with a separate measuring band 39.

The measuring band 39 can be shifted to selectable measuring locations 40 within the video image 35 and can be aligned in an arbitrary direction with respect to the XY measuring system 37, whereby, for example, the mid point of the measuring band 39 is defined as measuring location 40.

Before the sample engraving, one of the specimen cups 33 is selected as reference cup, the mid point thereof to be the reference location 41 for the positioning of the measuring band 39 to the desired measuring location 40 within the video image 35. In a preferred way, the mid point of a specimen cup 33 for a rated mid gradation (M) is selected as reference location 41.

The determination of the measuring location 40 for the measuring bands 39 ensues by prescribing the coordinate-wise distances ($\Delta x^*$, $\Delta y^*$) from the reference location 41 dependent on the geometry of the engraving raster for each color separation. The reference location 41, the predetermined spacings ($\Delta x^*$, $\Delta y^*$) from the reference location 41 and the desired alignment of the measuring band 39 can be stored in the configuration memory 27.

Since the specimen cups 33 lie on the engraving lines 32, the spacing ($\Delta x^*$, [sic]) of the measuring band 39 from the reference location 41 is either 0 in X-direction, equal to the engraving line spacing or equal to a multiple of the engraving line spacing. The spacing ($\Delta y^*$) from the reference location 41 in Y-direction, by contrast, is dependent on what is to be measured.

For measuring the maximum transverse diagonal ($d_{qmax}$) or an arbitrary transverse diagonal ($d_q$), i.e. the expanse of the cup area in X-direction (feed direction), the measuring band 39 has its longitudinal expanse directed in X-direction. For measuring the maximum transverse diagonal ($d_{qmax}$), the distance ($\Delta y^*$) from the reference location 41 in the Y-direction is either 0, equal to the screen width in Y-direction or a multiple of the screen width. For measuring an arbitrary transverse diagonal ($d_q$), corresponding intermediate spacings from the reference location 41 in Y-direction are prescribed. The spacing ($\Delta x^*$,) of the measuring band 39 from the reference location 41 in the X-direction is either 0, equal to the engraving line spacing or to a multiple of the engraving line spacing in both instances.

For measuring the maximum longitudinal diagonal ($d_{Lmax}$) or an arbitrary longitudinal diagonal ($d_L$), i.e. the expanse of the cup area in Y-direction (circumferential direction), the measuring band 39 is aligned with its longitudinal expanse in Y-direction. For measuring the maximum longitudinal diagonal ($d_{Lmax}$), the spacing ($\Delta x^*$) of the measuring band 39 from the reference location 41 in the X-direction is either 0, equal to the engraving line spacing or to a multiple of the engraving line spacing. For measuring an arbitrary longitudinal diagonal ($d_L$), corresponding intermediate spacings from the reference location 41 are prescribed in the X-direction. The spacing ($\Delta y^*$) from the reference location 41 in the Y-direction is either 0, equal to the screen width in the Y-direction or to a multiple of the screen width in both instances.

For measuring the puncture ($d_{ds}$), i.e. the width of the engraving channel in the X-direction, which connects two cups engraved on an engraving line, the measuring band 39 has its longitudinal expanse again aligned in the X-direction. The spacing ($\Delta x^*$) of the measuring band 39 from the reference location 41 in the X-direction is again either 0, equal to the engraving line spacing or to a multiple of the engraving line spacing. The spacing ($\Delta y^*$) from the reference location 41 in the Y-direction is thereby either 0, equal to the screen width in the Y-direction or to a multiple of the screen width.

For measuring the web width ($d_{SB}$), i.e. the width of the material that remains standing between two deep cups engraved on neighboring engraving lines, the measuring band 39 is expediently turned such that it has its longitudinal expanse aligned approximately perpendicular to the course of the web.

The measuring band 39 is composed of at least one measuring line 39', preferably of a plurality of measuring lines 39' proceeding parallel to one another, and each measuring line comprises a plurality of pixels 36 whose spacing from one another represents a length increment. By counting the pixels 36 within a measuring distance, thus, the length of the measuring distance can be measured as a multiple of the length increment.

Figure 3A:
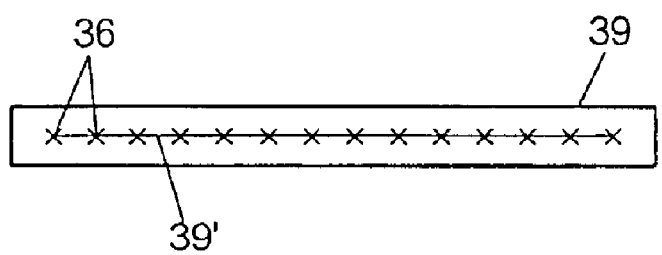
FIG. 3a shows the formation of a measuring band comprising a measuring line.

FIG. 3a shows the formation of a measuring band 39 that is composed of a measuring lines line 39' having fourteen pixels 36.

Figure 3B:
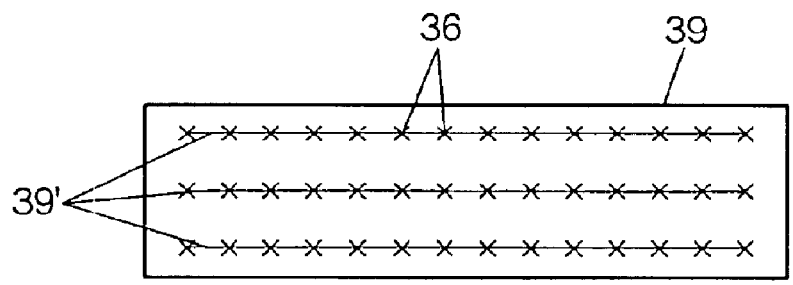
FIG. 3b shows the formation of a measuring band comprising three measuring lines.

FIG. 3b shows the formation of a measuring band 39 that is composed of three measuring lines 39' proceeding parallel to one another and each respectively having fourteen pixels 36.

As already mentioned, the edges of a cup area, of a web or of a puncture form a contour in the registered video image 35. The measuring distance for transverse diagonal, longitudinal diagonal, web width and puncture width thus derives from the respective distance of corresponding contours from one another.

The end points of a measuring distance for transverse diagonal, longitudinal diagonal, web width and puncture width are advantageously determined with the assistance of the measuring band 39 itself on the basis of an automatic recognition of two neighboring contours, in that the video data (VD) of two respectively successive pixels 36 of a measuring line 39 are examined for a contour transition.

Figure 4:
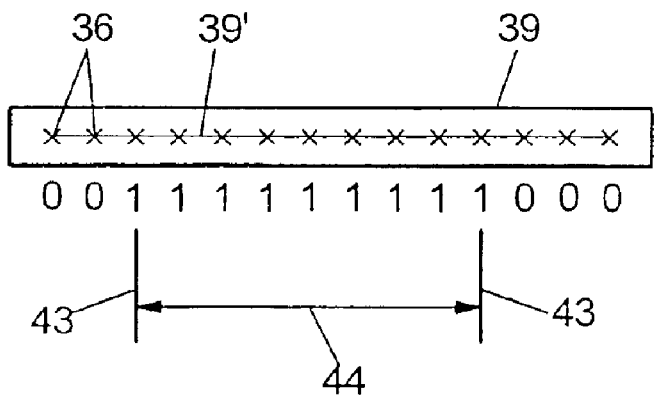
FIG. 4 is a graphic presentation directed to the automatic determination of a measuring distance within a measuring band.

FIG. 4 shows a measuring band 39 with a measuring line 39' and two contour lines 43 spaced from one another. The video data (VD) allocated to the individual pixels 36 are also shown, whereby the contour lines 43 are identified by the transition "0" to "1" and "1" to "0". On the basis of an automatic contour recognition, the end points of the measuring distance 44 are determined, this being eight pixels 36 long in the illustrated case.

The sequence in which the video data (VD) of neighboring pixels 36 are examined for automatic contour recognition is dependent on what is to be measured. In the measurement of the transverse diagonal ($d_Q$) or of the longitudinal diagonal ($d_L$), the video data (VD) are expediently examined proceeding from the middle of a measuring line 39', i.e. from the middle toward the edges of a cup area.

Given measurement of the puncture width ($d_{DS}$) or of the web width ($d_{SB}$) by contrast, it proves advantageous to examine the video data (VD) from the end points of a measuring line 39' toward the middle.

Figure 5:
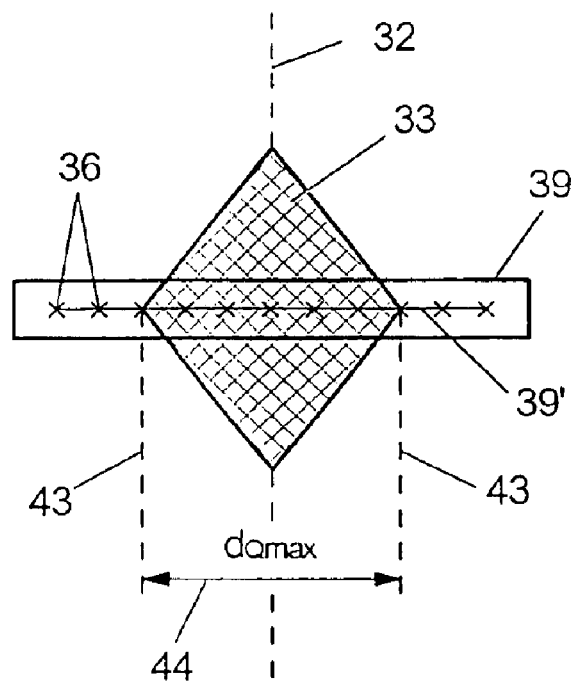
FIG. 5 is a graphic illustration directed to the measurement of the transverse diagonal of a sample cup.

FIG. 5 shows the measurement of the maximum transverse diagonal ($_{Qmax}$) of a sample cup 33 with the measuring band 39 directed in X-direction, whereby the end points of the measuring distance 44 are defined by the contours 43 of the sample cup 33.

Figure 6:
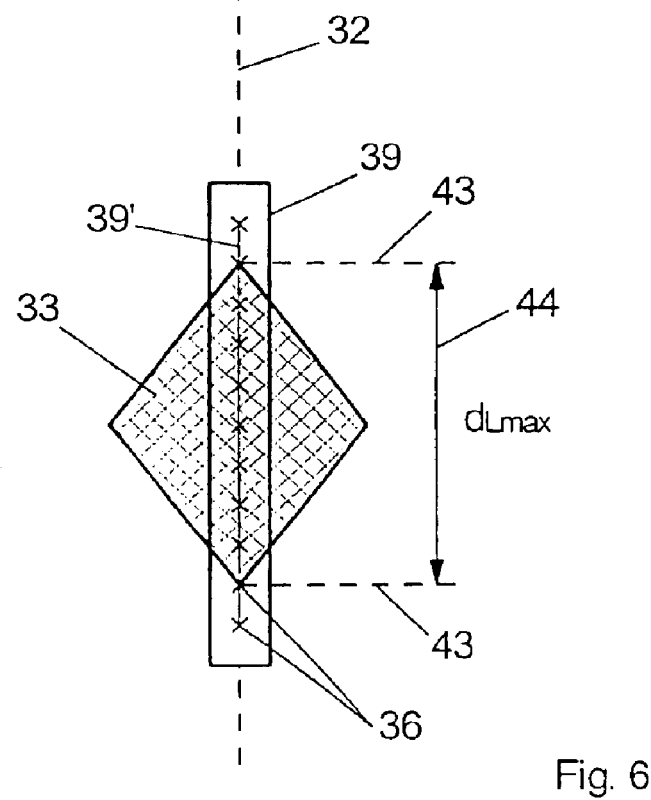
FIG. 6 is a graphic illustration directed to the measurement of the longitudinal diagonal of a sample cup.

FIG. 6 shows the measurement of the maximum longitudinal diagonal ($d_{Lmax}$) of a sample cup 33 with the measuring band 39 directed in the Y-direction.

Figure 7:
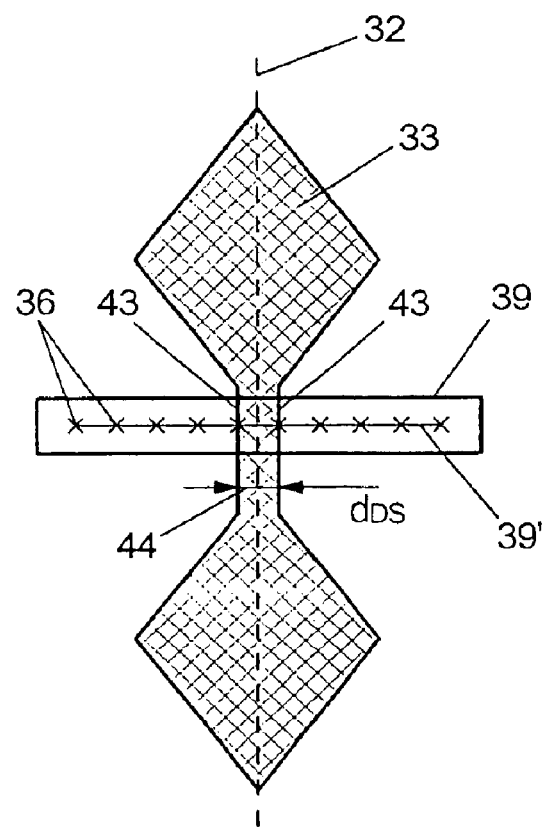
FIG. 7 is a graphic illustration directed to the measurement of the puncture width of two sample cups.

FIG. 7 shows the measurement of the puncture width ($d_{DS}$) of two sample cups 33 engraved side-by-side on an engraving line 32 for the gradation "dark" with the measuring band 39 aligned in the X-direction.

Figure 8:
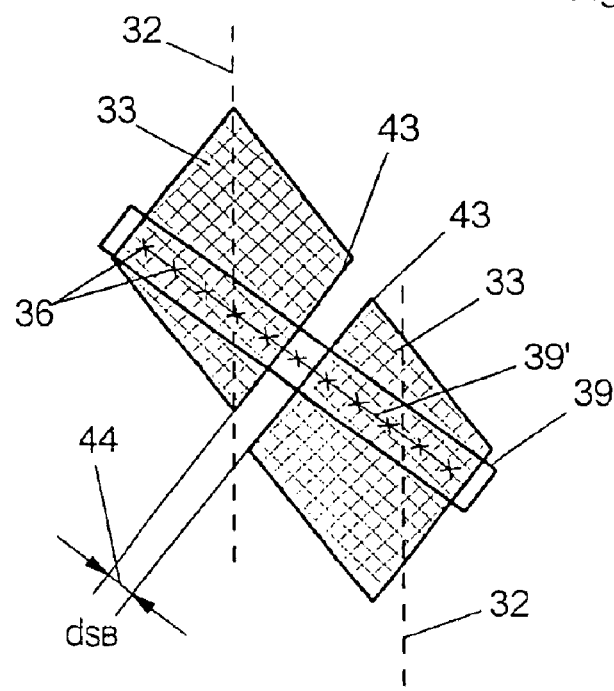
FIG. 8 is a graphic illustration directed to the measurement of the web width of two sample cups.

FIG. 8 shows the measurement of the web width ($d_{SB}$) of two sample cups 33 engraved on engraving lines 32 lying side-by-side with the measuring band 39 aligned transverse relative to the engraving lines 32.

For enhancing the recognition and measuring dependability as well as for measuring minimal or, respectively, maximal lengths and for measuring areas, measuring bands 39 having a plurality of measuring lines 39' are preferably employed.

The recognition and measuring dependability can be improved in that the measured results of every measuring line 39' are compared to one another and are only forwarded given coincidence. For determining maximum and minimum lengths, the measured results of the individual measuring line 39' are subjected to an extreme value selection. Given measurement of the transverse diagonal ($d_Q$) and of the longitudinal diagonal ($d_L$), a maximum selection is advantageously implemented and, a minimum selection is implemented given measurement of the web width ($d_{SB}$) and of the puncture ($d_{DS}$). For measuring a cup area, the measured results of the individual measuring lines 39' are added up.

For further improvement of the measuring dependability in an advantageous development of the method, a defined measuring area 45 is additionally placed around each sample cup 33 in the interpretation of the video image 35 whose maximum transverse diagonal ($d_{Qmax}$) or longitudinal diagonal ($d_{Lmax}$) is measured, the size of said measuring area at least corresponding to the cup area of the corresponding sample cup 33. The size of the measuring band 39 is adapted to the size of the measuring area 45, so that all pixels 36 within the measuring area 45 can be acquired by the measuring band 39.

The cup area of the corresponding sample cup 33 is then identified as a plurality of pixels 33 with the measuring band 39, in that the plurality of pixels 36 counted in each measuring line 39 of the measuring band 39 are added up.

The cup area of this sample cup 33 is then calculated from the maximum transverse diagonal ($d_{Qmax}$) or longitudinal diagonal ($d_{Lmax}$) of the sample cup 33 measured with the measuring band 39. When no coincidence is found between the calculated and the measured cup area of the sample cup 33, the measured result for the maximum transverse diagonal ($d_{Qmax}$) or longitudinal diagonal ($d_{Lmax}$) of the sample cup 33 is annulled.

Figure 9:
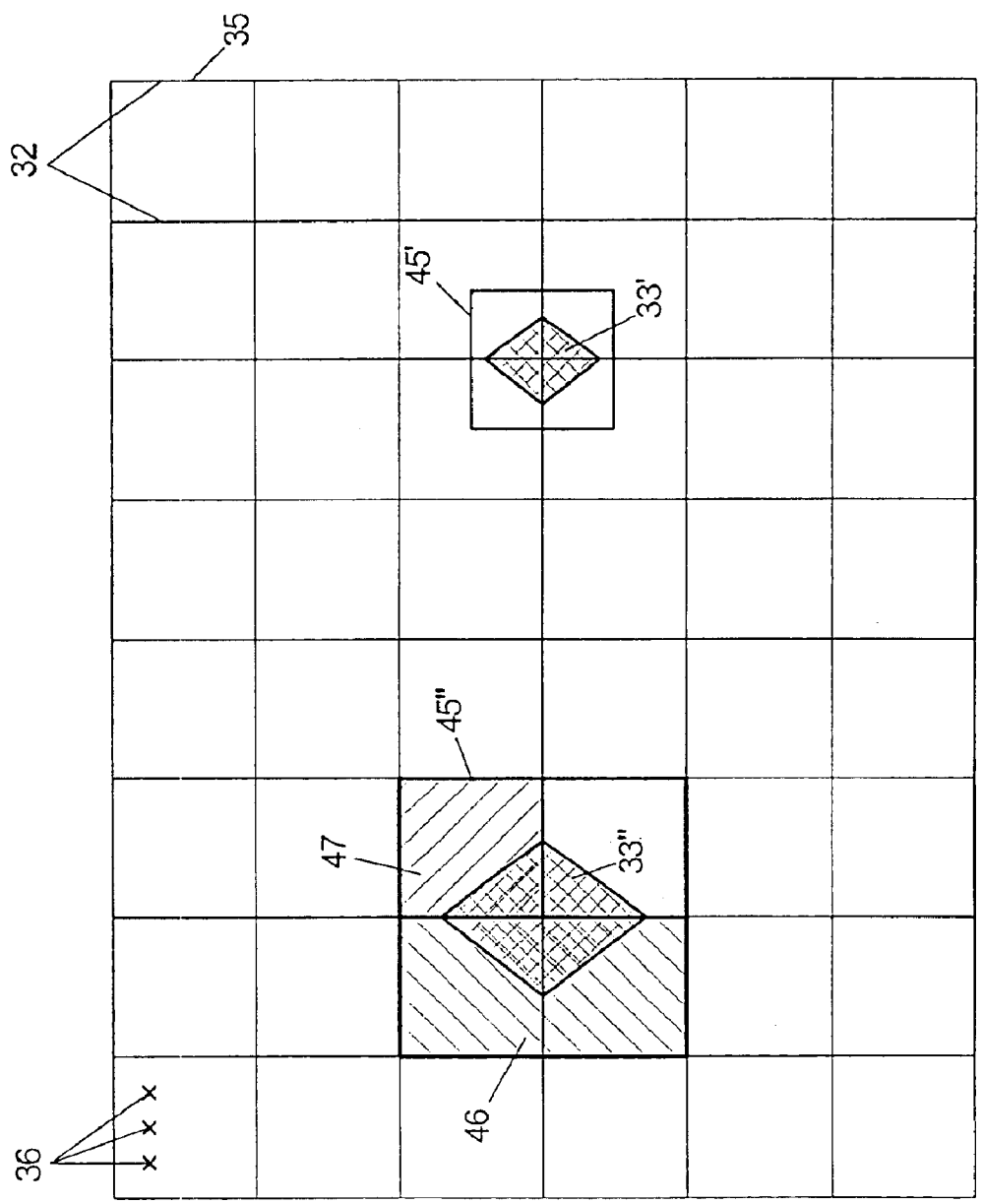
FIG. 9 is a video image of engraved sample cups with measuring surfaces around the sample cups.

FIG. 9 shows a further video image 35 of engraved sample cups 33. A measuring area 45 is defined around the cup area of a sample cup 33 for the gradation "light". A correspondingly large measuring area 45" is defined around the cup area of a sample cup 33" for the gradation "dark". Alternatively, only a sub-measuring area of the measuring area 45" can also be utilized for measuring the cup area of the sample cup 33", for example a sub-measuring area 46 that corresponds to half the measuring area 45" or a sub-measuring area 47 that corresponds to one-fourth of the measuring area 45". The entire cup area is then calculated from the area parts identified in the individual sub-measuring area 46, 47, whereby it must be taken into consideration whether it is a matter of symmetrical or asymmetrical surface parts with reference to the center of gravity of the area.

In another advantageous development of the method, the selected reference cup or the reference location 41 in the video image 35 is automatically identified on the basis of the characteristic quantity of the cup area of the selected reference cup.

For that purpose, the cup area of the selected reference cup is prescribed. The cup areas of all sample cups 33 are then identified in the video image 35 by evaluation of the video data (VD) of the individual pixels 36, and are respectively compared to the cup area of the selected reference cup. The reference cup and, thus, the reference location 41 is recognized when area coincidence is identified.

Alternatively, a recognition window can be defined that is smaller than the video image 35. In this case, the recognition window is shifted step-by-step over the video image 35, whereby a corresponding area comparison is implemented in every window position.

Although various minor changes and modifications might be proposed by those skilled in the art, it will be understood that my wish is to include within the claims of the patent warranted hereon all such changes and modifications as reasonably come within my contribution to the art.

I claim:

1. A method for producing and evaluating a sample cut in a electronic engraving machine for engraving printing forms for rotogravure, comprising the steps of:

forming an engraving control signal for driving the engraving stylus of an engraving element from engraving data which represent rated gradations between "light" and "dark" to be engraved and from a periodic raster signal for generating an engraving raster;

providing a sample engraving before actual engraving of the printing form, wherein sample cups are engraved for predetermined rated gradations;

producing a video image of the sample cups engraved in the sample engraving;

for measuring geometric parameters of the engraved sample cups, selecting an engraved sample cup in the video image for one of the predetermined rated gradations as a reference location in an XY-measuring system allocated to the video image;

dependent on the raster parameters of the engraving raster, defining measuring locations for measuring the geometric parameters of the sample cups in the video image as coordinate-related spacings from the selected reference location;

measuring the geometric parameters of the sample cups at the determined measuring locations by interpreting the video image, and comparing them to the geometric parameters that define the predetermined rated gradations;

deriving setting values from the comparison with which the engraving control signal is calibrated such that the engraved actual gradations correspond to the rated gradations to be engraved;

with the engraving stylus engraving a sequence of cups arranged in the engraving raster engraving line by engraving line into the printing cylinder, geometric parameters of the cups defined engraved, actual gradations; and with the engraving element implementing a feed motion directed in an axial direction of the printing cylinder for planar engraving of the printing cylinder.

2. The method according to claim 1 wherein sample cups for the rated gradations "light", "dark" and at least one "mid gradation" are engraved in the sample engraving.

3. The method according to claim 1 wherein the sample cups for the rated gradations "light", "dark" and "mid gradation" are respectively engraved on neighboring engraving lines.

4. The method according to claim 1 wherein the sample cups are engraved over an engraving line region on each engraving line.

5. A method for producing and evaluating a sample cut in a electronic engraving machine for engraving printing forms for rotogravure, comprising the steps of:

forming an engraving control signal for driving the engraving stylus of an engraving element from engraving data which represent rated gradations between "light" and "dark" to be engraved and from a periodic raster signal for generating an engraving raster;

providing a sample engraving before actual engraving of the printing form, wherein sample cups are engraved for predetermined rated gradations;

producing a video image of the sample cups engraved in the sample engraving;

for measuring geometric parameters of the engraved sample cups, selecting an engraved sample cup in the video image for one of the predetermined rated gradations as a reference location in an XY-measuring system allocated to the video image; an area mid point of an engraved sample cup being selected as the reference location dependent on the raster parameters of the engraving raster, defining measuring locations for measuring the geometric parameters of the sample cups in the video image as coordinate-related spacings from the selected reference location;

measuring the geometric parameters of the sample cups at the determined measuring locations by interpreting the video image, and comparing them to the geometric parameters that define the predetermined rated gradations;

deriving setting values from the comparison with which the engraving control signal is calibrated such that the engraved actual gradations correspond to the rated gradations to be engraved;

with the engraving stylus engraving a sequence of cups arranged in the engraving raster engraving line by engraving line into the printing cylinder, geometric parameters of the cups defining engraved, actual gradations; and with the engraving element implementing a feed motion directed in an axial direction of the printing cylinder for planar engraving of the printing cylinder.

6. The method according to claim 1 wherein an area mid point of an engraved sample cup for a rated gradation "mid gradation" is selected as the reference location.

7. The method according to claim 1 wherein the geometric parameters of the sample cups to be measured are at least one of transverse diagonal, longitudinal diagonal, punctures, web widths or cup areas of the engraved sample cups.

8. The method according to claim 1 wherein the video image is divided into pixels;

a measuring field displaceable over the video image onto the defined measuring location is produced for measuring the geometric parameters of the sample cups;

the measuring field comprises at least one measuring line with a plurality of pixels whose spacings from one another represent length increments;

the plurality of pixels of the measuring line devolving onto a measuring distance in the video image are counted; and a length of the measuring distance is determined as a multiple of the length increments.

9. The method according to claim 8 wherein the measuring distance in the video image is defined by a spacing of two contours belonging to a sample cup.

10. The method according to claim 9 wherein the contours of the sample cups are recognized by an automatic interpretation of the video image.

11. The method according to claim 9 wherein the contours of the sample cups are recognized with at least one measuring line of the measuring band.

12. A method for producing and evaluating a sample cut in a electronic engraving machine for engraving printing forms for rotogravure, comprising the steps of:

forming an engraving control signal for driving the engraving stylus of an engraving element from engraving data which represent rated gradations between "light" and "dark" to be engraved and from a periodic raster signal for generating an engraving raster;

providing a sample engraving before actual engraving of the printing form, wherein sample cups are engraved for predetermined rated gradations;

producing a video image of the sample cups engraved in the sample engraving;

for measuring geometric parameters of the engraved sample cups, selecting an engraved sample cup in the video image for one of the predetermined rated gradations as a reference location in an XY-measuring system allocated to the video image;

dependent on the raster parameters of the engraving raster, defining measuring locations for measuring the geometric parameters of the sample cups in the video image as coordinate-related spacings from the selected reference location, measuring the geometric parameters of the sample cups at the determined measuring locations by interpreting the video image, and comparing them to the geometric parameters that define the predetermined rated gradations;

deriving setting values from the comparison with which the engraving control signal is calibrated such that the engraved actual gradations correspond to the rated gradations to be engraved;

with the engraving stylus engraving a sequence of cups arranged in the engraving raster engraving line by engraving line into the printing cylinder, geometric parameters of the cups defining engraved, actual gradations; and with the engraving element implementing a feed motion directed in an axial direction of the printing cylinder for planar engraving of the printing cylinder;

the video image is divided into pixels;

a measuring field displaceable over the video image onto the defined measuring location is produced for measuring the geometric parameters of the sample cups;

the measuring field comprises at least one measuring line with a plurality of pixels whose spacings from one another represent length increments;

the plurality of pixels of the measuring line devolving onto a measuring distance in the video image are counted; and a length of the measuring distance is determined as a multiple of the length increments the measuring distance in the video image being defined by a spacing of two contours belonging to a same cup;

each pixel of the video image having a video datum allocated to it that identifies whether the corresponding pixel is a component part of a sample cup or not;

the video data of respectively two successive pixels of the measuring line being examined for a modification; and an identified modification of the video data being recognized as a contour.

13. The method according to claim 12 wherein the investigation of the video data for the recognition of contours of traverse diagonals and longitudinal diagonals occurs proceeding from a middle to ends of the measuring line.

14. The method according to claim 12 wherein the investigation of the video data for the recognition of the contours of puncture and web widths occurs from ends to a middle of the measuring line.

15. The method according to claim 8 wherein a mid point of the measuring field is defined as a measuring location.

16. The method according to claim 8 wherein the sample cup for "light", "dark" and "mid gradation" respectively has a separate measuring band allocated to it.

17. A method for producing and evaluating a sample cut in a electronic engraving machine for engraving printing forms for rotogravure, comprising the steps of:

forming an engraving control signal for driving the engraving stylus of an engraving element from engraving data which represent rated gradations between "light" and "dark" to be engraved and from a periodic raster signal for generating an engraving raster;

providing a sample engraving before actual engraving of the printing form, wherein sample cups are engraved for predetermined rated gradations;

producing a video image of the sample cups engraved in the sample engraving;

for measuring geometric parameters of the engraved sample cups, selecting an engraved sample cup in the video image for one of the predetermined rated gradations as a reference location in an XY-measuring system allocated to the video image;

dependent on the raster parameters of the engraving raster, defining measuring locations for measuring the geometric parameters of the sample cups in the video image as coordinate-related spacings from the selected reference location;

measuring the geometric parameters of the sample cups at the determined measuring locations by interpreting the video image, and comparing them to the geometric parameters that define the predetermined rated gradations;

deriving setting values from the comparison with which the engraving control signal is calibrated such that the engraved actual gradations correspond to the rated gradations to be engraved;

with the engraving stylus engraving a sequence of cups arranged in the engraving raster engraving line by engraving line into the printing cylinder, geometric parameters of the cups defining engraved, actual gradations; and with the engraving element implementing a feed motion direction in an axial direction of the printing cylinder for planar engraving of the printing cylinder;

the video image is divided into pixels;

a measuring field displaceable over the video image onto the defined measuring location is produced for measuring the geometric parameters of the sample cups;

the measuring field comprises at least one measuring line with a plurality of pixels whose spacings from one another represent length increments;

the plurality of pixels of the measuring line devolving onto a measuring distance in the video image are counted;

a length of the measuring distance being determined as a multiple of the length increments;

the measuring field being formed as a stripe-shaped measuring band; and a longitudinal expanse of the measuring band amounting to at least a spacing of two engraving lines from one another.

18. The method according to claim 16 wherein the measuring band in a measuring location has its longitudinal expanse directed in an arbitrary direction with respect to an XY measuring system.

19. The method according to claim 16 wherein the measuring band has its longitudinal expanse aligned in an X-direction of a measuring system which is a feed direction for measuring transverse diagonal and puncture.

20. The method according to claim 16 wherein the measuring band has its longitudinal expanse aligned in a Y-direction of an XY measuring system which is a circumferential direction for measuring longitudinal diagonals.

21. The method according to claim 16 wherein the measuring band has its longitudinal expanse aligned transversely, to the path of the web for measuring web widths in XY measuring system.

22. The method according to claim 16 wherein the measuring band comprises a plurality of measuring lines arranged parallel to one another;

measured results achieved with the individual measuring lines are compared to one another; and the measured result of a measuring line, for enhancing the measuring dependability, is only forwarded given coincidence of the measured results compared to one another.

23. The method according to claim 16, wherein the measuring band comprises a plurality of measuring lines arranged parallel to one another;

measured results achieved with the individual measuring lines are subjected to an extreme value selection; and only a highest or lowest measured result is forwarded.

24. The method according to claim 16 wherein the measuring band comprises a plurality of measuring lines arranged parallel to one another;

measuring results achieved with the individual measuring lines are added up for determining a size of an area; and a sum is forwarded as measured result.

25. The method according to claim 16 wherein a maximum transverse diagonal or longitudinal diagonal of a sample cup is measured with the measuring band;

the cup area of the corresponding sample cup is calculated from the measured, maximum transverse diagonal or longitudinal diagonal;

the cup area of the corresponding sample cup is measured with the measuring band;

the measured and the calculated cup area are compared to one another; and the measured result for the maximum transverse diagonal or longitudinal diagonal is forwarded only given coincidence of measured and calculated cup area.

26. The method according to claim 1 wherein the sample cup, which should be the reference location, is automatically identified in the video image.

27. The method according to claim 1 wherein a cup area of the sample cup selected as the reference location is prescribed;

cup areas of all sample cups are identified in the video image on the basis of video data;

the identified cup areas of the sample cups are compared to the predetermined cup area; and that sample cup whose measured cup area coincides with the predetermined cup area is marked as the reference location.

28. A method for producing and evaluating a sample cut in an electronic engraving machine, comprising the steps of:

forming an engraving control signal for driving an engraving element from engraving data, which represent rated gradations between "light" and "dark" to be engraved and from a periodic raster signal for generating an engraving raster;

providing a sample engraving before actual engraving wherein sample cups are engraved for predetermined rated gradations;

producing a video image of the sample cups engraved in the sample engraving;

for measuring geometric parameters of the engraved sample cups, selecting an engraved sample cup in the video image for one of the predetermined rated gradations as a reference location in a system allocated to the video image;

dependent on the raster parameters of the engraving raster, defining measuring locations for measuring geometric parameters of the sample cups in the video image as coordinate-related spacings from the selected reference location;

measuring the geometric parameters of the sample cups at the determined measuring locations by interpreting the video image, and comparing them to the geometric parameters that define the predetermined rate gradations; and deriving setting values from the comparison with which the engraving control signal is calibrated such that the engraved actual gradations correspond to the rated gradations to be engraved; and engraving cups with the engraving element.

* * * * *